United States Patent
Strehlau et al.

(10) Patent No.: US 6,413,904 B1
(45) Date of Patent: Jul. 2, 2002

(54) NITROGEN OXIDE STORAGE CATALYST

(75) Inventors: Wolfgang Strehlau, Dossenheim; Ulrich Göbel, Hattersheim; Rainer Domesle, Alzenau-Kälberau, all of (DE)

(73) Assignee: OMG AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 09/417,915

(22) Filed: Oct. 13, 1999

(30) Foreign Application Priority Data

Oct. 13, 1998 (DE) .......................................... 198 47 008

(51) Int. Cl.[7] .......................... B01J 23/58; B01J 23/40; B01J 23/42
(52) U.S. Cl. ...................... 502/328; 502/327; 502/334; 502/339; 502/527.12; 502/527.15
(58) Field of Search ............................... 502/327, 328, 502/330, 332, 334, 339, 341, 344, 349, 355, 439, 527.12, 527.15, 527.16, 527.18, 527.19, 304; 423/213.5

(56) References Cited

U.S. PATENT DOCUMENTS

| 4,128,503 | A | * | 12/1978 | Yamauchi et al. | ........... 252/435 |
| 4,220,559 | A | * | 9/1980 | Polinski | ................. 252/455 R |
| 4,369,132 | A | * | 1/1983 | Kinoshita et al. | ...... 252/466 PT |
| 4,902,664 | A | * | 2/1990 | Wan | ........................... 502/300 |
| 5,075,275 | A | * | 12/1991 | Murakami et al. | .......... 502/303 |
| 5,116,800 | A | * | 5/1992 | Williamson et al. | ........ 502/303 |
| 5,643,542 | A | * | 7/1997 | Leyrer et al. | ................ 423/212 |
| 5,677,258 | A | * | 10/1997 | Kurokawa et al. | .......... 502/303 |
| 5,762,892 | A | * | 6/1998 | Kasahara et al. | ......... 423/213.5 |
| 5,911,960 | A | * | 6/1999 | Miyoshi et al. | ........... 423/213.5 |
| 5,958,826 | A | * | 9/1999 | Kurokawa et al. | .......... 502/303 |
| 5,972,830 | A | * | 10/1999 | Yoshida et al. | ............. 502/304 |
| 6,010,673 | A | * | 1/2000 | Kanazawa et al. | ....... 423/213.5 |
| 6,022,825 | A | * | 2/2000 | Andersen et al. | ........... 502/303 |
| 6,145,303 | A | * | 11/2000 | Strehlau | ...................... 60/274 |
| 6,171,565 | B1 | * | 1/2001 | Hohne et al. | ............ 423/239.1 |

FOREIGN PATENT DOCUMENTS

| DE | 3531871 | 7/1989 |
| EP | 0 303 495 A1 | 2/1989 |
| EP | 0 303 495 B1 | 1/1992 |
| WO | 95/09687 | 4/1995 |
| WO | 97/02886 | 1/1997 |
| WO | 97/43031 | 11/1997 |

* cited by examiner

Primary Examiner—Steven P. Griffin
Assistant Examiner—Cam N. Nguyen
(74) Attorney, Agent, or Firm—Pillsbury Winthrop LLP; David Kalow (57) ABSTRACT

A nitrogen oxide storage catalyst which contains at least one catalyst material and at least one nitrogen oxide storage component from the group of alkali and alkaline earth metals. The nitrogen oxide storage component, after completing catalyst preparation, is present as finely divided barium sulfate, strontium sulfate, a mixture or mixed crystals of the two sulfates, or as their complete or incomplete decomposition product with an average particle size of less than 1 μm. Barium sulfate and/or strontium sulfate act as feed materials for the active storage component in the storage catalyst according to the invention. As a result of the reductive exhaust gas compositions occurring under normal automobile driving conditions barium sulfate and strontium sulfate decompose to compounds which are able to store nitrogen oxides. This compensates for the loss of active storage components which occurs due to aging. Barium sulfate and/or strontium sulfate may be decomposed during production by means of reductive calcination in order to obtain a high initial loading of the catalyst with storage compounds. In this case, these sulfates are used as auxiliary agents in order to introduce the highest possible concentrations of storage compounds into the storage catalyst.

27 Claims, 2 Drawing Sheets

NITROGEN OXIDE STORAGE CATALYST

CROSS-REFERENCE TO RELATED APPLICATION

This application is based on German Application DE 198 47 008.8, filed Oct. 13, 1998, which disclosure is incorporated herein by reference.

FIELD OF THE INVENTION

The invention provides a nitrogen oxide storage catalyst which contains at least one finely divided catalyst material and also at least one nitrogen oxide storage component from the group of alkali and alkaline earth metals.

BACKGROUND OF THE INVENTION

Nitrogen oxide storage catalysts are used for the exhaust gas treatment of lean-mix operated gasoline engines (so called lean-mix engines) and diesel engines. These engines are operated with greater than the stoichiometric air to fuel ratio, that is the oxygen content in this mixture is substantially larger than would be required for complete combustion of the fuel. The oxygen excess in the exhaust gas from these engines is also correspondingly high. For this reason the hydrocarbons (HC), carbon monoxide (CO) and nitrogen oxides ($NO_x$) contained in the exhaust gas cannot be converted with well-known three-way catalytic converters since these require a stoichiometrically composed exhaust gas for the simultaneous conversion of these harmful substances.

However, hydrocarbons and carbon monoxide can easily be converted into carbon dioxide and water by oxidation in the presence of an exhaust gas catalyst due to the high oxygen content of these engines. The conversion of nitrogen oxides on the other hand presents great difficulties. Nitrogen oxide storage catalysts have been suggested for solving this problem. These catalysts contain basic compounds that are able to absorb the nitrogen oxides from the lean-mix exhaust gas or to react with them to give nitrates and they are thus removed from the exhaust gas. Suitable compounds for this purpose are the oxides of alkali and alkaline earth metals. Some of these compounds are present in air in the form of carbonates and hydroxides which are also suitable for the storage of nitrogen oxides.

The mode of operation of nitrogen oxide storage catalysts is described in detail in the SAE-document SAE 950809. In addition to basic storage compounds, these catalysts also contain platinum as a catalytically active component in order to oxidize nitrogen oxides, most of which are present as nitrogen monoxide, to nitrogen dioxide so that they can react with the basic storage compounds in the required manner. The storage capacity of the storage compounds reduces as storage of the nitrogen oxides increases. The storage compounds must therefore be regenerated from time to time. For this purpose, the air to fuel mixture and thus also the exhaust gas is enriched for a short period. Under the reducing exhaust gas conditions which then exist, the stored nitrates are decomposed again to give nitrogen oxides and are converted to nitrogen, water and carbon dioxide with consumption of the reducing constituents in the exhaust gas on the catalytically active component.

Nitrogen oxide storage catalysts are generally deposited in the form of a coating on the walls of the flow channels of inert support structures in a honeycomb shape. These so-called honeycomb structures are generally shaped in the form of a cylinder. They have flow channels for the exhaust gas which are parallel to the axis and these are arranged in a regular array over the cross section of the honeycomb structure. The number of flow channels per cross section of area on the honeycomb structure, also known as the cell density, is between 10 and 200 $cm^2$. The amount of catalyst coating on the honeycomb structure, that is the loading of the honeycomb structure with the storage catalyst, is generally quoted as a concentration in grams per liter volume (g/l) of the honeycomb structure.

The basic problem with known nitrogen oxide storage catalysts is their low resistance to aging, that is their storage capacity is irreversibly damaged with increasing operating time due to the high exhaust gas temperatures. The reasons for this damage are many and various and depend on the particular formulation of the storage catalyst.

The storage compounds are generally applied in highly dispersed form to the surface of a support material in order to ensure sufficient interaction of the storage compounds with the exhaust gas. One basic aging mechanism, according to SAE Technical Paper 970746, consists of the storage compound reacting with the support material. Thus, in the case of a storage material consisting of barium oxide on zirconium oxide which has been aged for a period of 24 hours at 750° C., the production of barium zirconate $BaZrO_3$ has been observed. Barium oxide on titanium oxide leads to the production of barium titanate. In both cases this reaction of the storage compound with the support material was associated with a high loss of nitrogen oxide storage capacity. Zirconium oxide and titanium oxide are thus not suitable as supports for alkali and alkaline earth metal storage compounds due to their high tendency to react with barium oxide if they are subjected to high thermal stresses under the conditions of use. Aluminum oxide behaves slightly better as a support material. However even here the production of barium aluminate takes place at high temperatures with prolonged aging.

Various combinations of storage compounds and support materials which are also intended to solve the aging problem have been disclosed in the patent literature. Thus EP 0 562 516 A1 describes a catalyst of barium oxide, lanthanum oxide and platinum on a support material of aluminum oxide, zeolite, zirconium oxide, aluminum silicate or silicon dioxide, wherein at least some of the barium oxide and the lanthanum oxide form a mixed oxide. Due to this mixed oxide, the production of lanthanum aluminate, which would otherwise lead to aging of the catalyst, is intended to be suppressed. Loading concentrations of 0.05 to 10.0 mol/l are cited for the storage compounds on the honeycomb structure used as a support structure for the catalyst coating. In the case of barium oxide as a storage compound, this means a maximum loading with up to 1534 g/l. The concentrations mentioned in the examples are 0.15 mol barium oxide per liter of honeycomb structure, that is 23 g/l.

To suppress reaction of the storage compound with an aluminum oxide support, EP 0 645 173 A2 suggests dissolving lithium in the support in such a way that a solid solution of aluminum oxide and lithium is produced. 0.3 mol of barium oxide per liter of honeycomb structure is mentioned as the loading concentration in the examples, that is 46 g/l.

EP 0 653 238 A1 suggests titanium oxide, which contains at least one element from the group of alkali metals, alkaline earth metals and rare earth metals in the form of a solid solution, as support material. This document mentions 0.1 mol/l as a loading concentration for the storage compounds and thus lies within the scope of the values mentioned above.

EP 0 657 204 A1 mentions the mixed oxides $TiO_2$—$Al_2O_3$, $ZrO_2$—$Al_2O_3$ and $SiO_2$—$Al_2O_3$ as support materials for nitrogen oxide storage catalysts. In addition, mixed oxides of $TiO_2$, $Al_2O_3$ with alkaline earth metals and rare earth metals, in particular $TiO_2$—$Al_2O_3$—$Sc_2O_3$, $TiO_2$—$Al_2O_3$—$Y_2O_3$, $TiO_2$—$Al_2O_3$—$La_2O_3$ and $TiO_2$—$Al_2O_3$—$Nd_2O_3$, are mentioned as support materials. The loading concentrations for the storage compounds mentioned in the examples are also 0.3 mol/l.

EP 0 666 103 A1 describes a catalyst which contains a nitrogen oxide storage compound and a noble metal on a porous support material. Aluminum oxide, zeolite, zirconium oxide, aluminum silicate and silicon dioxide are suggested as support materials. The nitrogen oxide storage compound and noble metal are deposited in close association on the same support particles. In addition, the catalyst may also contain cerium oxide as an oxygen storing compound, wherein cerium oxide is kept separate from the noble metal and thus also from the nitrogen oxide storage compound. The loading concentration for the storage compounds in the examples in this document is again 0.3 mol/l.

EP 0 718 028 A1 discloses a heat-resistant nitrogen oxide storage material. The high heat-resistance is obtained by dispersing the nitrogen oxide storage compound very finely in the support material. For this purpose, a solution of a compound of at least an alkali metal, an alkaline earth metal and a rare earth metal is mixed with a solution of an oxide sol of at least one metal from the groups IIIb, IVa and IVb of the periodic system and converted into a gel, dried and calcined. The resulting storage material is amorphous. In the examples, this storage material is combined, inter alia, with a catalyst powder which contains platinum on a high surface area cerium/zirconium mixed oxide. The cerium/zirconium mixed oxide thus forms the support material here for the platinum component.

EP 0 771 584 A1 also describes a heat-resistant support material for catalysts which also consists of an amorphous mixed oxide. The amorphous mixed oxide is composed of a nitrogen oxide storage compound from the group of alkali metals, alkaline earth metals, rare earth metals and of aluminum oxide and at least one oxide from the group titanium oxide, zirconium oxide and silicon-dioxide. Aluminum oxide is an important constituent of the amorphous mixed oxide and is present in a molar ratio of 4 to 12 with respect to the storage compound. The support material may also contain cerium oxide as an oxygen storing material. The cerium oxide and nitrogen oxide storage compound should only be present in a molar ratio with respect to each other in the support material of between 0.5 and 3. Outside these limits, the heat-resistance is impaired according to data from EP 0 771 584 A1.

WO 97/02886 describes a nitrogen oxide storage catalyst in which the storage compound and catalytically active component are spatially separated from each other but are located in adjacent regions. For this purpose the storage compound and catalytic component are applied to the support structure in two superimposed layers. Alternatively, the storage compound and catalytic component may be deposited onto different support particles which are then applied together in the form of a coating on the support structure. As an alternative to this, according to this document, there is also the possibility of introducing the storage compound as a solid, relatively coarse powder material in the coating, wherein at least 90% of the powder particles have diameters in the range between 5 and 15 $\mu$m. Metal oxides, metal hydroxides, metal carbonates and mixed metal oxides are described as storage compounds. The metals may be lithium, sodium, potassium, rubidium, caesium, magnesium, calcium, strontium or barium.

The loading concentrations mentioned for the storage compounds are 0.05 to 3 g/in$^3$, that is 3 to 183 g/l. In the examples, honeycomb structures were coated with about 60 g/l of powdered strontium oxide.

According to WO 97/02886, the storage material may contain a sulfur absorbing component to protect it against poisoning by sulfur, preferably cerium oxide. This cerium oxide may be present in the form of particles alongside particles of the storage material or they may be dispersed in the nitrogen oxide storage compound.

EP 0 692 302 B1 discloses a process for the treatment of exhaust gas in which the exhaust gas is brought into contact with a catalyst which contains a porous support material on which platinum group metals and storage compounds are deposited. The storage compounds have an average particle diameter in the range between 0.1 and 20 $\mu$m. The optimum particle diameters mentioned are 0.5 to 10 $\mu$m. The storage compounds are added as powdered materials to the coating dispersion for the storage catalyst. So that their particulate structure is retained in the aqueous coating dispersion, storage compounds which are insoluble in water, from the group barium carbonate, barium oxalate and barium oleate, are used. If a dispersion in an organic medium is used, then barium acetate, barium formate, barium citrate, barium oxide, barium nitrite, barium nitrate, barium hydroxide or barium tartrate may also be used. The loading concentration on a honeycomb structure using these storage compounds is again cited as 0.3 mol/l. Due to the particle size of more than 0.1 $\mu$m, undesired reaction of the storage compound with sulfur oxides contained in the exhaust gas is suppressed.

The storage capacity of nitrogen oxide storage catalysts known from the prior art is still inadequate over a long operating period. Aging may be caused, for example, by a reaction of the storage compounds with the support materials which leads to a loss of basicity and thus to storage capacity. Even when there is no tendency for reaction between the storage compound and the support material, there may still be a reduction in storage capacity due to a decrease in the specific surface area of the storage material.

Another aging process was observed, by the inventors, with storage catalysts in which, for example, the platinum therein came into direct contact with barium oxide. This is always the case when barium oxide is introduced by impregnating the catalyst with a soluble pre-cursor of barium oxide. As demonstrated by ongoing investigations, these storage catalysts exhibit an exceptional freshly prepared activity. However, if the catalyst material is loaded too heavily, the catalytic activity of the platinum for the conversion of nitrogen monoxide to nitrogen dioxide under oxidizing conditions is impaired, in particular after aging of the catalyst. This observation is probably based on a reaction between platinum and barium oxide. In the case of a nitrogen oxide storage catalyst applied to a honeycomb structure in the form of a coating, therefore, the subsequent loading of the catalyst with the storage compounds by impregnation should be restricted to less than 20 g/l.

A fourth, but largely reversible, aging process is the reaction of the storage compounds with the sulfur oxides contained in the exhaust gas to give relatively thermally stable sulfates. Sulfates can be decomposed at exhaust gas temperatures higher than 550° C. and with stoichiometric or rich-mix exhaust gas compositions with the release of sulfur oxides and the formation of the storage compounds again.

As a result of the aging mechanisms described above, the storage capacity of storage catalysts decreases with increasing operating time and eventually falls below the storage capacity required for problem-free operation.

One solution to this problem might comprise increasing the loading of the storage catalyst with the storage compounds in order to extend the operating period within which the storage capacity falls to a value which is unacceptable for problem-free functioning of the storage catalyst. However in the case of supported storage compounds there is the problem that the current honeycomb structures can be loaded only with loading concentrations of up to 400 g/l at an acceptable cost. Higher loadings can be achieved only with costly multiple coating procedures and always involve the risk of blocking the flow channels.

About half the coating concentration available is taken up by the catalyst material in order to ensure adequate conversion rates for nitrogen monoxide to nitrogen dioxide. Since in the case of supported storage compounds the storage compounds themselves make up only about 20 wt. % of the support material, the concentration of storage compounds on the honeycomb structures which can be achieved in this way is restricted to about 20 to 40 g/l.

Subsequent impregnation of the final coating with precursor compounds of additional storage compounds can also be used only to a restricted extent since, in accordance with the aging process discussed above, there is a risk here that the catalytically active platinum metals might be restricted in their catalytic activity by the storage compounds.

Although the particulate storage compounds which are used as an alternative to supported storage compounds enable a higher amount of storage compounds to be introduced in practice into the nitrogen oxide storage catalyst, these have the disadvantage that, from the outset, they are an order of magnitude coarser than the aged storage particles on the support materials. Therefore they have only a low surface area for interaction with the exhaust gas. Their theoretical, molar storage capacity can thus be used only to a limited extent.

EP 0 303 495 B1 describes a catalyst which contains a) an active aluminum oxide, b) a stabilizer which is substantially insoluble in water, selected from the group strontium sulfate and barium sulfate, in an amount of 0.5 to 50 wt. %, with respect to the weight of active aluminum oxide, and c) a catalytically active component dispersed on the active aluminum oxide. The particles of stabilizer preferably have a size greater than 0.1 $\mu$m. The catalyst is used as a three-way catalytic converter and enables simultaneous conversion of the harmful substances carbon monoxide, hydrocarbons and nitrogen oxides contained in a stoichiometrically composed exhaust gas. It is characterized by excellent thermal stability. A good thermal resistance is achieved by, for example, diffusing the barium from barium sulfate particles into the neighboring particles of active aluminum oxide and stabilizing its specific surface area at high exhaust gas temperatures of up to 1100° C. The catalyst in accordance with this EP document is used as a three-way catalytic converter in a stoichiometrically composed exhaust gas. Operation in a lean-mix exhaust gas from lean-mix engines with alternating storage and release of the nitrogen oxides is not intended and would also fail because the barium component is consumed to stabilize the aluminum oxide particles.

DE 197 39 925 A1 describes an exhaust gas treatment catalyst for a diesel carbon black filter which reduces the combustion temperature of the carbon black. The catalyst consists of a metal oxide, at least one alkali metal sulfate selected from the group consisting of sulfates of Li, Na, K, Rb and Cs and/or at least one alkaline earth metal sulfate from the group of sulfates of Be, Mg, Ca, Sr and Ba. Alternating storage and release of the nitrogen oxides contained in the diesel exhaust gas is not intended with this diesel carbon black filter.

WO 95/09687 discloses a process for removing carbon monoxide, hydrocarbons and nitrogen oxide from oxygen-rich exhaust gases on a supported noble metal catalyst which has been pre-treated in a gas mixture of oxygen and an inert gas at temperatures above 400° C. This catalyst has a wider temperature window for the reduction of nitrogen oxide than known catalysts. The catalyst may contain barium sulfate. No information is given about the average particle size of the barium sulfate particles. The process described converts the nitrogen oxides contained in the exhaust gas continuously, with simultaneous oxidation of carbon monoxide and hydrocarbons, to give carbon dioxide, water and nitrogen. Alternating storage and release of the nitrogen oxides does not take place.

SUMMARY OF THE INVENTION

The object of the present invention is therefore to provide a composition for a nitrogen oxide storage catalyst which enables the storage catalyst to be provided with a high concentration of storage compounds, which in the case of known storage catalysts has hitherto only been possible by introducing the storage compounds into the catalyst in the form of a solid powder with a large particle diameter and a correspondingly low interaction surface area for the exhaust gas. In particular, the object of the invention is to provide a nitrogen oxide storage catalyst which enables a substantially higher loading with storage compounds than a storage catalyst with only highly dispersed storage compounds. Another object of the invention is to provide a catalyst with improved stability of its storage capacity with respect to thermal aging during operation of the catalyst and the use of this catalyst for treating exhaust gases from lean-mix engines with alternating lean-mix and rich-mix exhaust gas compositions.

This object is achieved by a nitrogen oxide storage catalyst which contains at least one finely divided catalyst material and at least one nitrogen oxide storage component. The nitrogen oxide storage catalyst is characterized in that the nitrogen oxide storage component, after completing preparation of the catalyst, is present as finely divided barium sulfate, strontium sulfate or as a mixture or mixed crystals of the two sulfates or as their complete or incomplete decomposition product with an average particle diameter of less than 1 $\mu$m.

Before describing the present invention in detail the following definitions are provided:

The freshly prepared state of the storage catalyst is the state of the catalyst after completing preparation of the catalyst, that is after completing all the production steps including any subsequent calcination.

A finely divided material is understood to be a powdered material which is introduced into the catalyst as such. In the English language patent literature the expression used for this is "bulk material" or "particulate material". These materials are frequently used as support materials for catalytically active components or other highly dispersed constituents of the catalyst. For this purpose, the support materials must have a high specific surface area, (also BET surface area, measured for example according to DIN 66132) for the adsorption of these components. In the context of this invention, the finely divided materials are called high surface area if their specific surface area is more than 10 $m^2$/g.

Highly dispersed materials have to be differentiated from the finely divided materials. Highly dispersed materials may be deposited for example by impregnation onto finely divided, high surface area support materials. For this, the support materials are generally impregnated with water-soluble precursor compounds of the highly dispersed materials. As a result of an appropriate thermal treatment, the precursor compounds are then converted into the highly dispersed materials. The particle size of these highly dispersed materials is about 5 to 50 nm. In the case of highly dispersed barium oxide on a support material, typical particle diameters of 20 nm (0.02 $\mu$m) were determined by the inventors with the aid of XRD analysis.

Catalyst materials in the context of this invention are understood to be any components of a conventional exhaust gas catalyst. A very wide variety of support materials and catalytically active components, oxygen storing materials and so called promoters are included among these. The catalytically active components and promoters are generally deposited in highly dispersed form on the support materials. Noble metals from the platinum group and of these in particular platinum, palladium, rhodium and iridium are suitable as catalytically active components for the purposes of the invention. The promoters are generally base metals which modify the catalytic activity of the noble metals.

Suitable support materials for the catalytically active components are known from the prior art and are high surface area support materials such as for example active aluminum oxide, cerium oxide, zirconium oxide, titanium oxide, silicon dioxide, zeolites and the mixed oxides aluminum silicate and cerium/zirconium mixed oxides. The support materials may be stabilized against thermal stresses encountered during the treatment of car exhaust gases by doping with, for example, lanthanum oxide.

The expression "active aluminum oxide" is understood to mean high surface area aluminum oxides from the transition series of the crystallographic phases. These include chi, delta, gamma, kappa, theta and eta-aluminum oxide. The active aluminum oxides have specific surface areas of up to 400 m$^2$/g. Gamma-aluminum oxide ($\gamma$-Al$_2$O$_3$) is preferably used. For thermal stabilization, the active aluminum oxides may contain, for example, lanthanum oxide, barium oxide or silicon dioxide.

Storage compounds in the context of this invention are elements from the alkali and alkaline earth metals. These are preferably potassium, rubidium, cesium, magnesium, calcium, strontium and barium. They produce highly basic oxides which can bond nitrogen dioxide in the form of nitrates. The oxides in the storage components are therefore also called storage compounds or active storage compounds. The expression "storage compound," however, is also understood here to mean the reaction products of the oxides with air or with the exhaust gas components to give carbonates and hydroxides which are also able to store nitrogen oxides as nitrates. The storage capacity of the storage compounds is generally greater the more basic is the compound.

The storage materials must be differentiated from the storage compounds. Storage materials are supported storage compounds, that is the storage compounds deposited onto suitable support materials in a highly dispersed form. In the context of this invention, however, storage compounds which are present in finely divided form are also called storage materials.

Decomposition products of barium and strontium sulfate are those compounds which are formed from sulfates in a reducing atmosphere during calcination. These are generally the oxides, carbonates and hydroxides of barium and strontium, that is active storage compounds.

Following this explanation of the expressions used, the invention is described in more detail in the following.

DETAILED DESCRIPTION OF THE PREFERRED EMBODIMENTS

The catalyst according to the invention contains at least some of the storage components in the form of finely divided sulfates in the freshly prepared state. These are either barium sulfate, strontium sulfate or a mixture or mixed crystals of these two materials.

Figure 1:
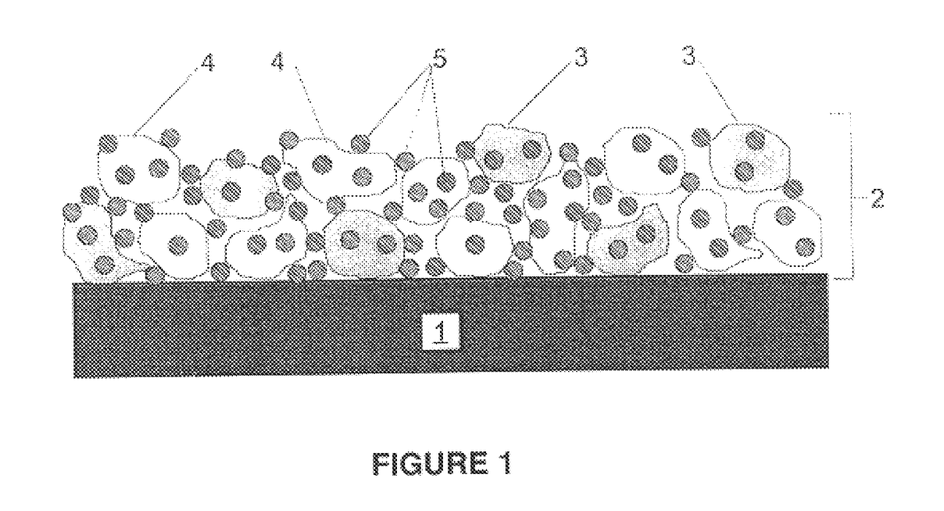
FIG. 1: Schematic diagram of a mono-layered catalyst consisting of finely divided catalyst materials (3,4) and barium sulfate particles (5).

FIG. 1 shows, by way of example, the structure of a catalyst according to the invention which was applied in the form of a coating (2) on an inert support structure (1). The catalyst contained, for example, two different finely divided catalyst materials (3) and (4), of which material (3) is an active aluminum oxide activated with platinum and material (4) is an oxygen storing component or a cerium/zirconium mixed oxide activated with rhodium. Reference number (5) indicates particulate barium and/or strontium sulfate which is distributed over the entire catalyst layer and is also in contact with the catalyst materials.

Barium and/or strontium sulfate is present in the catalyst according to the invention in finely divided form. The proportion of storage component in the catalyst material may therefore be substantially increased, since no support material which generally does not make a contribution to the storage capacity of the storage material and thus acts only as ballast material for the task of storing nitrogen oxides is used.

The introduction into the catalyst of storage components in the form of sulfates has hitherto appeared illogical because sulfates are not able to store nitrogen oxides. The invention therefore makes use of the fact that sulfates in the storage components can be converted into the corresponding active storage compounds at elevated exhaust gas temperatures of more than 550° C. and with stoichiometrically composed or rich-mix exhaust gas with the release of sulfur oxides. The sulfates in the storage components are thus converted into active storage compounds due to desulfatization.

Desulfatization is already used in the case of known storage catalysts for reversing the poisoning of storage components by the sulfur oxides contained in exhaust gases. For this purpose, these operating conditions are deliberately brought about from time to time by the engine electronics system. The exhaust gas conditions required for desulfatization, however, generally occur during normal driving conditions whenever the engine is operated under slightly reducing exhaust gas conditions with a partial load or a full load.

Therefore it is possible initially to introduce the storage components barium and/or strontium into the catalyst in a form in which they are not able to store nitrogen oxides. Due to the desulfatization process brought about from time to time by the engine electronics system or by corresponding operating conditions in the engine, sulfates are slowly converted into active storage compounds. The sulfates in the storage component therefore act as a feed material in the storage catalyst and as solid precursor compounds for the active storage compounds.

The particle size of the finely divided sulfate has a particular importance in the present invention. According to the invention it should be less than 1 $\mu$m, preferably less than 0.5 $\mu$m and in particular less than 0.3 $\mu$m. Particularly advantageous grades of barium or strontium sulfate have particle sizes of less than 0.1 $\mu$m.

The barium or strontium sulfate materials which are preferably used are thus much more finely divided than the normal finely divided components in a catalyst which generally have an average particle diameter of between 1 and 5 $\mu$m. They are however much more coarsely divided than the storage compounds applied in highly dispersed form. Whereas the highly dispersed storage compounds on the support materials are present with average particle sizes of about 0.02 $\mu$m, the barium or strontium sulfate materials to be used according to the invention have average particle diameters of more than 0.03 $\mu$m, preferably more than 0.05 $\mu$m. To determine these small particle diameters, a transmission electron microscope (TEM), for example, may be used.

As tests on barium sulfate have shown, the particle size remains substantially the same during conversion to barium oxide, or barium carbonate or barium hydroxide, due to the stabilizing effect of the other components in the catalyst.

The surface area available for interaction with the exhaust gas depends on the particle size of the storage compounds. The smaller the particle size, the larger is the surface area. If the storage particle is approximately spherical, then the ratio of its surface area F to its volume V is given by $$\frac{F}{V} = \frac{6}{D},$$

where D is the diameter of the particle. In Table 1 given below, this ratio is shown for various radii of particles. Here, all the values are normalized to the ratio for particles of diameters of 0.02 $\mu$m since that is the typical particle size of supported storage compounds.

TABLE 1

| D ($\mu$m) | Ratio of surface area to volume $\frac{F}{V}\vert_D / \frac{F}{V}\vert_{D=0.02}$ |
|---|---|
| 0.02 | 1 |
| 0.1 | 0.2 |
| 0.25 | 0.08 |

TABLE 1-continued

| D ($\mu$m) | Ratio of surface area to volume $\frac{F}{V}\vert_D / \frac{F}{V}\vert_{D=0.02}$ |
|---|---|
| 0.5 | 0.04 |
| 1.0 | 0.02 |
| 5.0 | 0.004 |
| 15.0 | 0.0013 |

This table shows that when using a certain mass of storage compounds (a specific volume) the available surface area decreases with increasing particle size. In order to compensate for this decrease when changing over from particles with diameters of 0.02 $\mu$m to particles with diameters of 0.1 $\mu$m, the mass of the storage compounds has to be increased by a factor of 5 (1/0.2). When changing over to particles with a diameter of 1 $\mu$m, the mass must be magnified by the factor of 50 in order to provide the same interaction area. The use of finely divided storage compounds with particle diameters of more than 1 $\mu$m is therefore not useful in the case of storage catalysts according to the invention.

The use according to the invention of finely divided sulfates as solid precursors for active storage compounds is of decisive advantage as compared with the direct use of powdered storage compounds in accordance with WO 97/02886 or EP 0 692 302 B1. These advantages apply in particular to barium sulfate. Barium sulfate is a physiologically acceptable material. It is used, for example, in medicine as an X-ray contrast agent. It is not soluble in water. It is commercially available, as a stabilizer for pigment mixtures, in very finely divided form with average particle diameters of less than 0.1 $\mu$m. In addition, it can be dispersed in water with great success due to its neutrality. The resulting dispersion is stable for a long time without the use of dispersing aids.

Barium sulfate is obtained industrially by a precipitation process from solutions of barium chloride or barium sulfide, to which is added dilute sulfuric acid or a sodium sulfate solution, with constant stirring. The reaction conditions determine the average particle size produced. The particularly finely divided barium sulfate required for the invention can be obtained, for example, by rapid precipitation from highly concentrated solutions at high pH and low temperatures. This precipitation process may also be performed "in situ" during production of the catalyst. In the case of separate production of the barium sulfate, the barium sulfate obtained from the precipitation process is preferably used in the non-dried state, that is to say in a moist, pasty form.

Table 2 given below contains, by way of example, the properties of 3 grades of barium sulfate which are commercially available from Sachtleben Chemie GmbH and which are suitable for nitrogen oxide storage catalysts according to the invention.

| | SACHTOPERSE ® | | |
|---|---|---|---|
| | HP | HU-N | HU-D |
| Particle size $d_{50}$ ($\mu$m) | 0.2 | <0.1 | <0.1 |
| Specific surface area (m$^2$/g) | 12 | >25 | >25 |
| PH | 6 | 7 | 9 |
| Soluble constituents, 105° C. (%) | <0.5 | <0.5 | <0.5 |

The estimates of surface area to volume of powdered materials mentioned above apply strictly only to non-porous materials where the specific surface area is substantially given by their geometric surface area. This requirement is largely satisfied for the sulfate to be used according to the invention. The barium sulfate materials listed in table 2 have spherical particles, according to data from the manufacturer. As has been shown, the size of the particles of barium sulfate is largely retained even after aging.

These advantageous properties of sulfates are not shown by the finely divided compounds proposed as storage components in WO 97/02886 and EP 0 692 302 B1. Some of them are soluble in water and agglomerate in the coating dispersion to produce large particles with a loss of surface area. According to WO 97/02886, strontium oxide has to be dispersed in water in an ice bath in order to prevent the water from boiling due to the heat of reaction. The resulting coating dispersion is not stable due to the intense interaction between the particles and therefore requires particular monitoring during production.

In addition, the particle diameters of 5 to 15 μm proposed in WO 97/02886 are not suitable. According to Table 1, 250 and 750 times the mass of storage compounds respectively would have to be introduced into the coating in order to provide the same storage capacity as highly dispersed storage compounds deposited onto support materials.

As mentioned above, the comparison of surface areas in accordance with Table 1 only applies to non-porous materials. As demonstrated by tests performed by the inventor, the materials proposed in WO 97/02886 and EP 0 692 302 B1, in particular barium carbonate and barium oxalate, have specific surface areas of less than 1 $m^2/g$ after aging at 750° C. for 10 hours so that their specific surface area is actually substantially provided only by the geometric surface area.

In order for the nitrogen oxide storage catalyst according to the invention to be able to store nitrogen oxides even in the freshly prepared state, it may also contain at least one active nitrogen oxide storage compound selected from the group of alkali metals and alkaline earth metals, including potassium, rubidium, cesium, magnesium, calcium, strontium and barium in addition to the finely divided sulfates.

Figure 2:
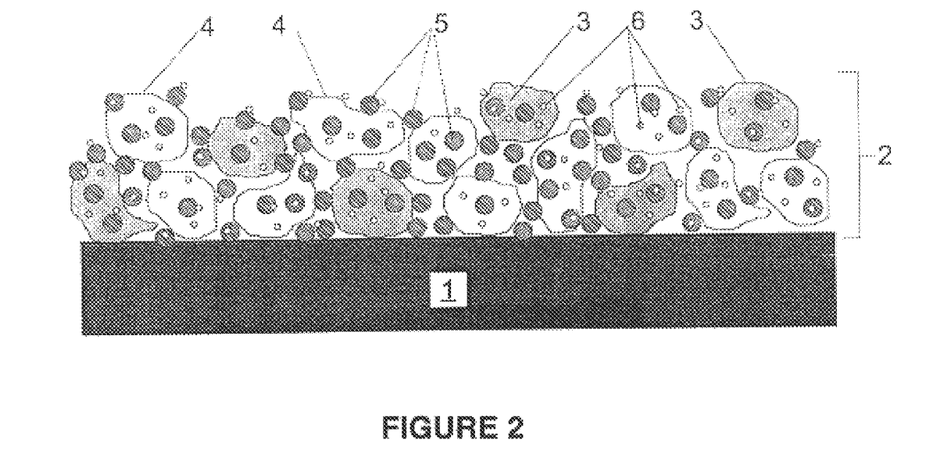
FIG. 2: Schematic diagram of a mono-layered catalyst consisting of finely divided catalyst materials (3,4), barium sulfate particles (5) and highly dispersed storage compounds (6) which have been introduced by subsequent impregnation.

This additional storage compound can be introduced into the catalyst by impregnating the storage catalyst with soluble precursors of the storage compounds. The catalyst is then calcined in order to convert the precursors into the actual storage compounds. The additional storage compounds in this case are present in highly dispersed form on all the finely divided components in the catalyst, that is on both the catalyst materials and also on the barium sulfate or strontium sulfate. This type of catalyst structure is shown schematically in FIG. 2. FIG. 2 differs from FIG. 1 by the additional, highly dispersed storage compound (6) which is deposited on all the finely divided components in the catalyst.

During this procedure, the storage compounds thus come into direct contact with catalytically active platinum group metals, for example with platinum. As mentioned above, there is therefore the risk of accelerated aging if too high a loading of storage compounds is used. This type of introduction should therefore be restricted to 20 g/l for the case where the storage catalyst is applied in the form of a coating to a honeycomb structure.

Figure 3:
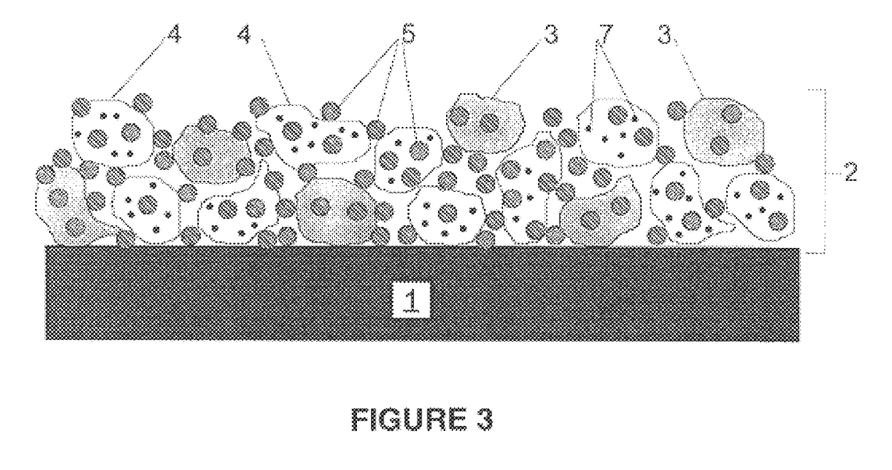
FIG. 3: Schematic diagram of a mono-layered catalyst consisting of finely divided catalyst materials (3,4), barium sulfate particles (5) and highly dispersed storage compounds (7), which have been deposited on only one of the two catalyst materials (4) by preliminary fixing.
Figure 4:
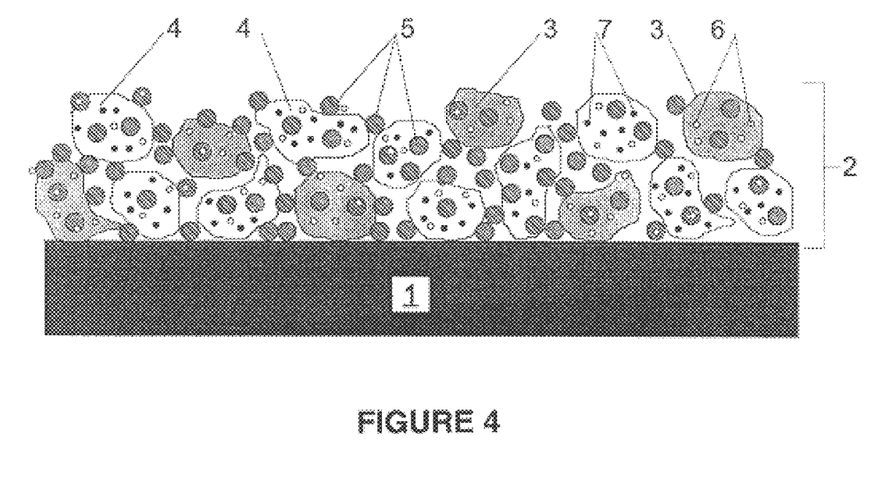
FIG. 4: Schematic diagram of a mono-layered catalyst consisting of finely divided catalyst materials (3,4), barium sulfate particles (5) and highly dispersed storage compounds (7), which have been deposited on only one of the two catalyst materials (4) by preliminary fixing and of storage compounds (6), which have been introduced by subsequent impregnation.

As an alternative to this procedure, the additional storage compounds are deposited on at least one of the catalyst materials before these are combined with the other components in the storage catalyst. This situation is shown in FIG. 3. Here, the additional highly dispersed storage compounds (7) are located only on the surface of catalyst material (4). As explained in more detail below, high surface area catalyst materials based on cerium oxide are particularly suitable as support materials for these additional storage compounds. After final production of this catalyst there is the possibility of depositing further storage compounds onto all the finely divided components of the catalyst by impregnation. The structure of the catalyst thus obtained is shown in FIG. 4. The further storage compounds are labelled with reference number (6). As shown in FIG. 2, storage compounds (6) are in close contact with all the finely divided components in the catalyst.

In addition to or instead of these additional or further storage compounds, it is possible to apply at least one further coating which has a different composition from the storage coating according to the invention when the catalyst is designed as a coating catalyst. Preferably, this is a further storage coating including at least one catalyst material and a highly dispersed nitrogen oxide storage compound. There is also the possibility of combining the storage coatings with a pure catalyst coating. The sequence of the coatings may be adjusted to the particular requirements of the application. The total concentration of these multiple layers may lie within or above the cited concentration range.

The finely divided catalyst materials in the storage catalysts according to the invention have two functions. During the storage phase, they should oxidize the nitrogen oxide contained in the exhaust gas to nitrogen dioxide under lean-mix exhaust gas conditions in order to enable their storage in the form of nitrates by the storage compounds. During the regeneration phase, on the other hand, the nitrogen oxides stored on the storage catalyst should be decomposed to produce nitrogen oxides again, under reducing exhaust gas conditions. The nitrogen oxides being released are then converted to nitrogen on the catalytically active components of the stored catalyst with consumption of the reductive exhaust gas constituents. During this phase the function of the storage catalyst approximates to that of a conventional three-way catalytic converter.

Therefore, the storage catalyst according to the invention preferably contains at least two different catalyst materials in order to be able to adjust the catalytic activity to the optimum. One of these catalyst materials should be at least one platinum group metal on a support material. In addition an oxygen storing compound may also be used as catalyst material, such as, for example, cerium oxide. To produce an effective three-way activity, a combination of platinum on active aluminum oxide with rhodium on a cerium/zirconium mixed oxide or on active aluminum oxide or on zirconium oxide, is preferably used. In order to fulfil the two functions mentioned above, the proportion of catalyst materials in the entire storage catalyst should be 40 to 95 wt. %, preferably 50 to 70 wt. %, and the concentration of catalytically active noble metals should be 0.01 to 5 wt. %, with respect to the total weight of storage catalyst.

The introduction of storage components in the form of finely divided sulfates in the storage catalyst in accordance with the invention enables the proportion of storage components in the entire weight of storage catalyst to be substantially increased as compared to their introduction as highly dispersed storage compounds. The proportion of storage components may be 5 to 60 wt. %, with respect to the total weight of storage catalyst, each calculated as oxides. The concentration of storage catalyst in the storage components, calculated as oxides, is preferably chosen to be between 30 and 50 wt. %. Due to the use of finely divided sulfates it is in fact possible to increase the concentration of nitrogen oxide storage catalyst in the storage components still further, but this can only be done by losing a proportion of catalyst material. Above about 60 wt. % the proportion of catalyst material is too small to be able to ensure the problem-free performance of both functions by the catalyst materials.

For use for automobile exhaust gas treatment, the storage catalyst is applied, in the form of a coating, to inert support structures made of ceramic or metal. These may be, for example, open-pored ceramic or metal foams or honeycomb structures with regularly arranged flow channels. The storage catalyst may be applied to this support structure by known techniques. For this, the components in the storage catalyst are processed to give, for example, an aqueous coating dispersion. The support structure can then be coated by immersing it in this coating dispersion. The storage catalyst is ready for use after drying and optionally calcining the coating.

Calcination may be performed at temperatures of up to 1000° C. in oxidizing or reducing atmospheres. If the calcination is performed in a reducing atmosphere then the finely divided sulfates are completely or partly converted into their decomposition products, depending on the duration of and temperature during calcination. These are the oxides, carbonates and/or hydroxides of the storage components which are able to store nitrogen oxides in the form of nitrates.

The loading concentrations of the storage catalysts on the support structures are 50 to 400 g/l, preferably 150 to 320 g/l. To apply high loading concentrations, it may be necessary to repeat the coating process several times until the desired concentration on the support structure is achieved.

The storage catalyst according to the invention still has a sufficient storage capacity, due to its high concentration of storage components, even after being subjected to high thermal stresses. The aging stability can be further improved if a support material which has a reduced tendency to react with the storage compounds is used for the storage compounds present in highly dispersed form.

It has been found that support materials based on cerium oxide are particularly suitable. In this case pure cerium oxide is less suitable because, under reducing exhaust gas conditions, such as occur from time to time during normal driving and as is deliberately initiated for the regeneration of the nitrogen oxide storage materials, it is subject to intense aging with a high loss of specific surface area.

However, cerium oxide can be stabilized against this type of aging by doping with the oxide of an element from the group consisting of silicon, scandium, yttrium and the rare earth metals, (lanthanum, praseodymium, neodymium, promethium, samarium, europium, gadolinium, terbium, dysprosium, holmium, erbium, thulium, ytterbium and lutetium) or mixtures of their oxides. For this purpose 0.5 to 20 wt. %, preferably 5 to 10 wt. % of the particular oxide or oxide mixture is required. In this case the concentration data refer to the total weight of stabilized cerium oxide. Doping can be achieved by processes known per se, such as for example, co-precipitation, co-thermal hydrolysis, impregnation and precipitation.

Suitable support materials for the storage compounds are also cerium/zirconium mixed oxides, although zirconium oxide cannot be used as the only support material because it reacts, for example, with barium oxide to give barium zirconate. However, this reaction is greatly reduced when present as a component of a mixed oxide with cerium oxide because the cerium oxide masks the zirconium oxide and thus largely suppresses reaction of the zirconium oxide with the barium oxide.

Cerium/zirconium mixed oxides are commercially available with a wide mixing ratio of cerium oxide to zirconium oxide and also, like pure cerium oxide, are widely used as oxygen storage materials in conventional three-way catalytic converters. Preparation of the cerium/zirconium mixed oxides may be achieved for example by mechanical mixing or impregnation or co-precipitation techniques. In the context of the present invention, the outstanding properties of these materials as support materials for storage compounds are important. Their oxygen storage capacity is of less importance.

Cerium/zirconium mixed oxides have particularly good properties as support materials for storage compounds when the concentration of zirconium oxide in the mixed oxide does not exceed 25 wt. %, preferably 20 wt. %, with respect to the total weight of mixed oxide. In order to provide the cerium oxide with adequate stability against reducing exhaust gas conditions, the concentration in the mixed oxide of zirconium oxide however should be not less than 1 wt. %. Particularly advantageously, the zirconium oxide concentration is between 5 and 15 wt. %. Very good results can be achieved with a concentration of 10 wt. % of zirconium oxide. With more than 25 wt. % of zirconium oxide the cerium oxide is no longer able to screen the zirconium oxide against reaction with the storage component at high temperatures. A cerium/zirconium mixed oxide with 30 wt. % of zirconium oxide is therefore no longer suitable as support material for the storage compounds under operating conditions with high exhaust gas temperatures.

The storage materials cited for the storage compounds based on cerium oxide, as was mentioned in the introductory discussion on the prior art, have not hitherto been disclosed. They can be combined according to the invention in an outstanding manner with the barium and/or strontium constituents, introduced as sulfates, in a nitrogen oxide storage catalyst in order to increase the aging stability of the catalyst still further. Of particular advantage is also the fact that the storage compounds deposited on cerium oxide can be desulfatized substantially more easily than when using other support materials.

The explanations given above as to the mode of action of the storage catalyst according to the invention show that the combination of barium sulfate or strontium sulfate with active storage compounds means that the loss of active storage compounds in the catalyst due to the aging processes is more or less compensated for by the decomposition of the barium sulfate or strontium sulfate. These sulfates act as feed materials for the corresponding storage compounds in the storage catalyst. Due to the relatively coarse particle size of the solid sulfates the desulfatizing process takes place only slowly so that even after long operating periods fresh storage compounds are still being provided due to decomposition of the sulfates.

However there is also the possibility of converting the sulfates in storage catalysts according to the invention completely or partly into the corresponding decomposition products and thus into a storage active form during the production process. In this case, the coated honeycomb structure is calcined at temperatures of up to 1000° C., preferably at temperatures between 550° C. and 800° C., in a reducing atmosphere. There is a risk during calcination that, due to the high temperatures, a reaction takes place between the catalyst materials and barium or strontium sulfate. This is undesirable since it would lead to a loss of storage material. The calcination temperatures have to be adjusted in an appropriate manner if necessary. Very good results have been obtained for example in reducing atmospheres at between 650° C. and 750° C. Reduction in forming gas (5 vol. % hydrogen, remainder nitrogen) is particularly suitable. The duration of calcination is selected so that the desired degree of desulfatization is achieved.

It is possible to convert the entire barium and/or strontium sulfate into the corresponding storage compounds by this reductive calcination. A storage catalyst is then obtained which has a high concentration of storage compounds in the freshly prepared state. Alternatively, only a specific percentage of the sulfate is reacted to give the storage compounds during reductive calcination. The remainder remains in the catalyst as buffer material to compensate for the aging taking place during use.

A storage catalyst according to the invention which in the freshly prepared state contains barium and strontium in the form of sulfates and also storage compounds on support materials based on cerium oxide has an exceptional aging stability since on the one hand the storage compounds deactivated by aging are compensated for by the desulfatization of barium and strontium sulfate and on the other hand the storage compounds on the support materials based on cerium oxide mentioned above have a substantially better aging stability from the outset than storage materials known from the prior art.

A nitrogen oxide storage catalyst of this type, due to its high concentration of storage components, has a very high tolerance towards sulfur oxides in the exhaust gas. In addition storage compounds which are deposited onto support materials based on cerium oxide can be readily desulfatized.

The invention is now explained in more detail using example formulations of a mono-layered and two-layered nitrogen oxide storage catalyst.

EXAMPLES

Mono-layered Storage Catalyst:

A single layered storage catalyst in accordance with the invention has the following composition in the freshly prepared state:

TABLE 3

| Mono-layered storage catalyst | |
|---|---|
| Component | Concentration |
| Pt-Al$_2$O$_3$ | 3.0 g/l Pt on 100 g/l Al$_2$O$_3$ |
| Rh-Al$_2$O$_3$ | 0.3 g/l Rh on 15 g/l Al$_2$O$_3$ |
| CeO$_2$ | 50 g/l |
| BaSO$_4$ (<0.1 μm) | 39 g/l |
| Total concentration | 207.3 g/l |

The catalyst composition given above contains CeO$_2$ as catalyst material in addition to Pt—Al$_2$O$_3$ and Rh—Al$_2$O$_3$. The addition of cerium oxide facilitates desulfatization of the barium sulfate and improves the three-way activity of the storage catalyst. The aluminum oxide used for Pt—Al$_2$O$_3$ and Rh—Al$_2$O$_3$ is an active aluminum oxide with specific surface area of 140 m$^2$/g.

To apply this coating to a honeycomb structure, a coating dispersion of the catalyst materials is first prepared. This is preferably an aqueous dispersion. The dispersion is milled so that the average particle size of the solids is within the range 2 to 4 μm. This particle size ensures good adhesion of the coating to the honeycomb structure. Only after milling the coating dispersion is the finely divided barium sulfate in pasty form stirred into the dispersion. Renewed milling is not required because the barium sulfate used does not tend to agglomerate in the coating dispersion.

The honeycomb structures are coated with the nitrogen oxide storage catalyst for example by immersion in this coating dispersion. Then the coating is generally dried at elevated temperatures of up to about 150° C. and then calcined in air to fix the coating at a temperature of up to 1000° C., preferably at a temperature in the range from 300° to 600° C. If partial desulfatizing of the freshly prepared catalyst is required, then calcination may be performed at a temperature of up to 1000° C., preferably at a temperature in the range from 550° to 800° C., in a reducing atmosphere. Forming gas, for example, is suitable for this purpose.

The catalyst in Table 3 contains 39 g/l barium sulfate. This corresponds to 27.3 g/l of barium oxide. The coating has a total concentration of 195.6 g/l, wherein the proportion of barium, calculated as oxide, is 14 wt. %, with respect to the total weight of coating.

The total concentration of coating cited in Table 3 can be applied to a honeycomb structure in one coating process. In order to introduce this same amount of barium oxide into the catalyst as a supported storage material with 20 wt. % of barium oxide in the coating, the total concentration would have to be increased to 304.8 g/l which is associated with considerable production problems. The possible alternative of introducing the required amount of barium oxide into the storage catalyst by impregnation with a soluble precursor compound fails here due to the impairment in the catalytically active components as a result of close contact with large amounts of barium oxide.

Two-layered Storage Catalyst:

Table 4 sets forth a possible composition of a two-layered storage catalyst in accordance with the invention:

TABLE 4

| Two layered storage catalyst | |
|---|---|
| Component | Concentration |
| 2nd layer | |
| Pt-Al$_2$O$_3$ | 1.5 g/l Pt on 50 g/l Al$_2$O$_3$ |
| Rh-Al$_2$O$_3$ | 0.3 g/l Rh on 15 g/l Al$_2$O$_3$ |
| CeO$_2$ | 20 g/l |
| BaSO$_4$ (<0.1 μm) | 35 g/l |
| 1st layer | |
| Pt-Al$_2$O$_3$ | 1.5 g/l Pt on 50 g/l Al$_2$O$_3$ |
| Ba-Ce/ZrO$_2$ | 20 g/l BaO on 110 g/l Ce/ZrO$_2$*) |
| Total concentration | 303.3 g/l |

*)Cerium/zirconium mixed oxide with 10 wt. % of zirconium oxide

The first layer set forth in Table 4 is applied directly to the honeycomb structure. The second layer makes contact with the exhaust gas. In the storage catalyst coating composition according to Table 4, the total concentration of the coating would have be raised to more than 400 g/l if the barium sulfate were to be replaced by an equivalent amount of supported barium oxide. This type of coating concentration could only be prepared with very considerable production problems.

The catalyst described here is preferably used in its various embodiments for the exhaust gas treatment of lean-mix engines. These engines are operated over a large proportion of their operating lifetime with a lean air to fuel mixture in order to save fuel. During the operating phases with lean exhaust gas compositions (storage phases) the nitrogen oxides contained in the exhaust gas are bonded to the storage compounds in the catalyst according to the invention. During operating phases with rich exhaust gas compositions (desorption phases) the stored nitrogen oxides are desorbed and reacted under the then reducing exhaust gas conditions. This repeated alternation of lean-mix and rich-mix exhaust gas compositions can be either produced by varying driving conditions or initiated by the engine control system periodically, depending on the design of the engine. In the latter case, the duration of the storage phase is, for example, 60 to 120 seconds. After each storage phase the air to fuel mixture is briefly switched over to a stoichiometric or rich-mix composition by the engine control system to desorb and convert the nitrogen oxides.

Desulfatization and initial activation of the storage components introduced into the catalyst in the sulfate form takes place either during "naturally" occurring desulfatizing conditions in the exhaust gas (above 550° C. and a rich-mix exhaust gas) or during periodic desulfatizing of the catalyst initiated by the engine control system. As mentioned above, the sulfates may also be converted into active storage compounds during the preparation process if it is thought that sufficient desulfatizing phases cannot be expected during operation of the engine.

Although very good treatment results are produced with the catalyst according to the invention described above when used on its own, it may be combined in a known manner with other catalysts. In particular, a starter catalyst can be inserted upstream of the catalyst and close to the engine in order to improve exhaust gas treatment during a cold start phase. Additional exhaust gas catalysts to further reduce hydrocarbon, carbon monoxide and nitrogen oxide emissions may also be inserted downstream of the catalyst. The configuration selected depends critically on the type of engine and its preferred area of use.

What is claimed is:

1. A nitrogen oxide storage catalyst comprising finely divided catalyst materials and a nitrogen oxide storage component, wherein:
    said nitrogen oxide storage component, after completion of catalyst preparation, is present as a finely divided material having an average particle diameter of less than 0.1 μm, and is selected from the group consisting of: barium sulfate, strontium sulfate, a mixture of barium sulfate and strontium sulfate; mixed crystals of barium sulfate and strontium sulfate; and a complete or incomplete decomposition product thereof.

2. The nitrogen oxide storage catalyst of claim 1, wherein said finely divided catalyst materials comprise:
    (a) platinum on active aluminum oxide;
    (b) rhodium on an oxide selected from the group consisting of: cerium/zirconium mixed oxide; active aluminum oxide; and zirconium oxide; and
    (c) a support material based on cerium oxide.

3. The nitrogen oxide storage catalyst of either claim 1 or claim 2, further comprising at least one additional nitrogen oxide storage compound selected from the group consisting of: potassium; rubidium; cesium; magnesium; calcium; strontium; barium; and mixtures thereof.

4. The nitrogen oxide storage catalyst of claim 3, wherein said additional nitrogen oxide storage compound is present in a highly dispersed form on said finely divided catalyst materials and said nitrogen oxide storage component.

5. The nitrogen oxide storage catalyst of claim 3, wherein said additional nitrogen oxide storage compound is present in a highly dispersed form on a support material based on cerium oxide.

6. The nitrogen oxide storage catalyst of claim 5, wherein a further storage compound is present in highly dispersed form on all of the finely divided constituents of the storage catalyst.

7. The nitrogen oxide storage catalyst of either claim 1 or claim 2, wherein the nitrogen oxide storage components are present in an amount of up to 60 weight percent (calculated as the oxide of each) relative to the total weight of said nitrogen oxide storage catalyst.

8. The nitrogen oxide storage catalyst of either claim 1 or claim 2, wherein said nitrogen oxide storage catalyst is present in the form of a coating on an inert honeycomb structure of ceramic or metal.

9. The nitrogen oxide storage catalyst of claim 8, wherein said nitrogen oxide storage catalyst comprises at least one additional coating.

10. The nitrogen oxide storage catalyst of claim 9, wherein said additional coating comprises a catalyst material and a nitrogen oxide storage compound.

11. The nitrogen oxide storage catalyst of claim 10, wherein said additional coating further comprises a storage compound on a catalyst material based on cerium oxide as support material and at least one platinum group metal on active aluminum oxide.

12. The nitrogen oxide storage catalyst of claim 11, wherein the catalyst material based on cerium oxide used as support material for the storage compound is a cerium/zirconium mixed oxide with a zirconium oxide concentration of between 1 and 25 weight percent calculated as the oxide and with respect to the total weight of mixed oxide.

13. The nitrogen oxide storage catalyst of claim 12, wherein said storage compound on the cerium/zirconium mixed oxide comprises a compound selected from the group consisting of: barium; strontium; and mixtures thereof.

14. The nitrogen oxide storage catalyst of claim 9, wherein the total coating material present in said inert honeycomb structure has a concentration of 50 to 400 g/l.

15. A nitrogen oxide storage catalyst, comprising finely divided catalyst materials; a first nitrogen oxide storage component; and a second nitrogen oxide storage component; wherein:
    (a) said finely divided catalyst materials comprise:
        (i) platinum on active aluminum oxide;
        (ii) rhodium on an oxide selected from the group consisting of: cerium/zirconium mixed oxide; active aluminum oxide; and zirconium oxide; and
        (iii) a support material based on cerium oxide;
    (b) said first nitrogen oxide storage component, after completion of catalyst preparation, is present as a finely divided material having an average particle diameter of less than 1 μm and is selected from the group consisting of: barium sulfate; strontium sulfate; a mixture of barium sulfate and strontium sulfate; mixed crystals of barium sulfate and strontium sulfate; and a complete or incomplete decomposition product thereof; and
    (c) said second nitrogen oxide storage component is:
        i) active;
        ii) present in a highly dispersed form on said support material based on cerium oxide; and
        iii) selected from the group consisting of: potassium; rubidium; cesium; magnesium; calcium; strontium; barium; and mixtures thereof.

16. The nitrogen oxide storage catalyst of claim 15, wherein the nitrogen oxide storage components are present in an amount of up to 60 weight percent (calculated as the oxide of each) relative to the total weight of said nitrogen oxide storage catalyst.

17. The nitrogen oxide storage catalyst of claim 15, wherein said nitrogen oxide storage catalyst is present in the form of a coating on an inert honeycomb structure of ceramic or metal.

18. The nitrogen oxide storage catalyst of claim 17, wherein said nitrogen oxide storage catalyst comprises at least one additional coating.

19. The nitrogen oxide storage catalyst of claim 18, wherein said additional coating comprises a catalyst material and a nitrogen oxide storage compound.

20. The nitrogen oxide storage catalyst of claim 19, wherein said additional coating further comprises a storage compound on a catalyst material based on cerium oxide as support material and at least one platinum group metal on active aluminum oxide.

21. The nitrogen oxide storage catalyst of claim 20, wherein said catalyst material based on cerium oxide used as support material for the storage compound is a cerium/zirconium mixed oxide with a zirconium oxide concentration of between 1 and 25 weight percent calculated as the oxide and with respect to the total weight of the mixed oxide.

22. The nitrogen oxide storage catalyst of claim 21, wherein said storage compound on the cerium/zirconium mixed oxide comprises a compound selected from the group consisting of: barium; strontium; and mixtures thereof.

23. The nitrogen oxide storage catalyst of claim 18, wherein the total coating material present on said inert honeycomb structure has a concentration of 50 to 400 g/l.

24. A process for preparing a nitrogen oxide storage catalyst in the form of a coating on the walls of flow channels in an inert honeycomb structure containing a finely divided catalyst material (wherein said finely divided catalyst material contains platinum on active aluminum oxide and rhodium on an oxide selected from the group consisting of: a cerium/zirconium mixed oxide; an active aluminum oxide; and a zirconium oxide) and a finely divided nitrogen oxide storage component, said process comprising:

(a) coating said inert honeycomb structure with a coating dispersion comprising said finely divided catalyst material and said finely divided nitrogen oxide storage component, wherein:
  (i) said finely divided nitrogen oxide storage component has an average particle size of less than 1 $\mu$m and is selected from the group consisting of: barium sulfate; strontium sulfate; a mixture of barium sulfate and strontium sulfate; and mixed crystals thereof;
  (ii) said finely divided nitrogen oxide storage component is added to said coating dispersion in a freshly precipitated, still moist, pasty form; and (b) drying said coating.

25. The process of claim 24, further comprising calcining the coating at a temperature of up to 1,000° C. in an oxidizing atmosphere.

26. The process of claim 24, further comprising calcining the coating at a temperature of 550° C. to 800° C. in a reducing atmosphere in order to convert the finely divided sulfates into corresponding decomposition products.

27. The process of claim 26, wherein said coating is calcined at a temperature of 650° C. to 750° C.

* * * * *